Figure 1:
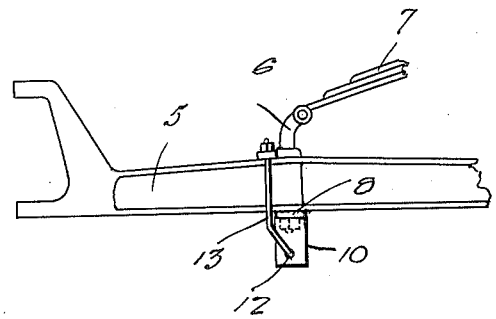

Dec. 21, 1926.

B. ELLIS

RADIUS ROD NUT CLAMP

Filed June 17, 1926

1,611,637

Inventor
Bruce Ellis

By Clarence A. O'Brien
Attorney

Patented Dec. 21, 1926.

1,611,637

UNITED STATES PATENT OFFICE.

BRUCE ELLIS, OF MISSOURI CITY, TEXAS.

RADIUS-ROD NUT CLAMP.

Application filed June 17, 1926. Serial No. 116,647.

This invention relates generally to locking means for nuts and has more particular reference to a clamp whereby the retaining nuts for automobile radius rod perches are maintained against accidental displacement with respect to the perch for obviously preventing the disconnection of the radius rods and consequent accidents caused from this contingency.

One of the main objects of the invention is to substantially improve and simplify over devices that have been heretofore used for this purpose.

To the attainment of this end, the present clamp consists of but few parts, and these of such a nature as to permit the same to be applied or removed by relatively inexperienced persons, and that is of such a nature that when once applied, is not liable to readily become displaced.

Figure 2:
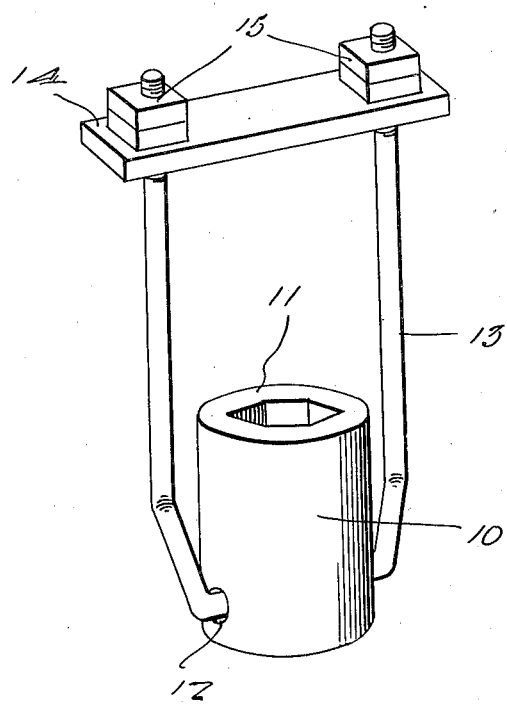

Other objects will become apparent as the nature of the invention will be better understood, the same comprising the novel form, combination and arrangement of parts hereinafter more fully described, shown in the accompanying drawings, and claimed. In the drawings wherein like reference characters indicate corresponding parts throughout both views:

Figure 1 is a fragmentary front side elevation of a well known automobile front axle disclosing one of the conventional spring perches to the lower end of which is attached one of the usual radius rods that is maintained secured to the axle by the conventional nut which is held against displacement by reason of the present clamp, and Figure 2 is an enlarged perspective of the clamp per se.

Now having particular reference to the drawing, 5 indicates the front axle of a well known form of automobile, 6 one of the spring perches arranged through a vertical socket formed in the axle and to the upper end of which is secured one end of the front supporting spring 7, and over the lower end of which is arranged the eye member 8 of a radius rod that is maintained in place by a nut 10 threaded upon the lower threaded end of the perch as is well known.

My invention per se constitutes the provision of a socket member 11 of suitable material, the socket within which is of a shape similar to the shape of the perch nut 10, said socket member receiving the first nut when applied as clearly disclosed in Figure 1. Formed at the lower end of the socket member is a transverse bore 12 through which loosely extends the lower connecting portion of a U-shaped clamping bolt 13. This clamping bolt is constructed from a metal rod bent into the formation disclosed more clearly in Figure 2, after the rod has been arranged through the transverse bore 12 in the socket member 11.

Intermediate their ends, the legs of the U-bolts are offset sidewardly and extend upwardly at opposite sides of the axle 5, as clearly disclosed in Figure 1, said legs being threaded at their upper ends, and serve to connect a transverse plate 14 disposed upon the top side of the axle 5, directly adjacent the upper end of the perch 6. After the plate has been associated with the upper ends of the U-bolt legs, locking nuts 15—15 are threaded thereon for rigidly binding the plate 14 to the top side of the axle and the socket member 11 to the underside of said axle for obviously preventing any turning movement of the nut 10 and the consequent loosening or displacement of the radius rod with respect to the perch.

It will thus be seen that I have provided a highly novel, simple and efficient form of device that is well adapted for the purposes heretofore designated, and even though I have herein shown and described the same as consisting of certain detail structural elements, it is nevertheless to be understood that some departure can be had without effecting the spirit and scope of the appended claim.

Having thus described my invention, what I claim as new is:

In a clamp of the character described, a socket member for engagement over the retaining nut of an automobile spring perch, a U-bolt secured at its lower end to the lower end of said socket member, the legs of which extend upwardly at opposite sides of the perch attached axle, and a connecting plate associated at its opposite ends with the upper ends of the legs above said axle.

In testimony whereof I affix my signature.

BRUCE ELLIS.